(12) United States Patent
Thibaux et al.

(10) Patent No.: US 7,716,011 B2
(45) Date of Patent: May 11, 2010

(54) STRATEGIES FOR IDENTIFYING ANOMALIES IN TIME-SERIES DATA

(75) Inventors: Romain J. Thibaux, San Francisco, CA (US); Emre M. Kiciman, Seattle, WA (US); David A. Maltz, Bellevue, WA (US); John C. Platt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 527 days.

(21) Appl. No.: 11/680,590

(22) Filed: Feb. 28, 2007

(65) Prior Publication Data

US 2008/0208526 A1 Aug. 28, 2008

(51) Int. Cl.
*G06F 17/18* (2006.01)

(52) U.S. Cl. .................. 702/179; 702/180; 702/181; 702/185

(58) Field of Classification Search ......... 702/179–181, 702/185; 705/35
See application file for complete search history.

(56) References Cited

U.S. PATENT DOCUMENTS

| 5,365,949 | A | 11/1994 | Nishizaka et al. |
| 5,465,321 | A | 11/1995 | Smyth |
| 6,463,364 | B2 | 10/2002 | Yamashita |
| 6,466,516 | B1 | 10/2002 | O'Brien, Jr. et al. |
| 6,625,569 | B2 | 9/2003 | James et al. |
| 6,934,649 | B2 | 8/2005 | Ageishi et al. |
| 7,027,950 | B2 * | 4/2006 | Zhang ......................... 702/181 |
| 7,103,491 | B2 | 9/2006 | Shim et al. |
| 7,158,917 | B1 * | 1/2007 | Bickford ...................... 702/181 |
| 7,194,394 | B2 * | 3/2007 | Dorfman et al. ............... 703/3 |
| 7,324,924 | B2 * | 1/2008 | Barajas et al. .............. 702/189 |
| 2006/0020866 | A1 | 1/2006 | Lo et al. |
| 2006/0164997 | A1 | 7/2006 | Graepel et al. |
| 2006/0183996 | A1 | 8/2006 | Abe et al. |
| 2007/0233435 | A1 * | 10/2007 | Bradski ........................ 703/2 |

OTHER PUBLICATIONS

Barford, et al., "A Signal analysis of Network Traffic Anomalies," accessible at <<http://www.imconf.net/imw-2002/imw2002-papers/173.pdf>>, available at least as of Dec. 18, 2006, pp. 1-12.

(Continued)

*Primary Examiner*—Eliseo Ramos Feliciano
*Assistant Examiner*—Ricky Ngon
(74) *Attorney, Agent, or Firm*—Lee & Hayes, PLLC

(57) ABSTRACT

A strategy is described for identifying anomalies in time-series data. The strategy involves dividing the time-series data into a plurality of collected data segments and then using a modeling technique to fit local models to the collected data segments. Large deviations of the time-series data from the local models are indicative of anomalies. In one approach, the modeling technique can use an absolute value (L1) measure of error value for all of the collected data segments. In another approach, the modeling technique can use the L1 measure for only those portions of the time-series data that are projected to be anomalous. The modeling technique can use a squared-term (L2) measure of error value for normal portions of the time-series data. In another approach, the modeling technique can use an iterative expectation-maximization strategy in applying the L1 and L2 measures.

17 Claims, 13 Drawing Sheets

OTHER PUBLICATIONS

Lowry, "Comparator and Cohort Benchmarking of LDC Cost," accessible at <<http://ww.oeb.gov.on.ca/documents/edr_revidence_CCsubmission_130105.pdf>>, Pacific Economics Group, Madison, Wisconsin, Jan. 12, 2005, pp. 1-50.

Simon, et al., "Supplementary Results For: Combining Static and Time Series Data to Determine the Quality of Expression Profiles in Time Series Experiments," accessible at <<www.cs.cmu.edu/~zivbj/compBio/SRChecksum.pdf>>, available at least as of Dec. 18, 2006, pp. 1-6.

Williams, "Profile Injection attack Detection for Securing Collaborative Recommender Systems1," accessible at <<http://facweb.cti.depaul.edu/research/TechReports/TR06-014.pdf>>, DePaul University CTI Technical Report, Jun. 2006, pp. 1-47.

Barford, et al., "A Signal Analysis of Network Traffic Anomalies," Proceedings of ACM SIGCOMM Internet Measurement Workshop, 2002, accessible at <<http://www.imconf.net/imw-2002/imw2002-papers/173.pdf>>, 12 pages.

Lowry,"Comparator and Cohort Benchmarking of LDC Cost," accessible at <<http://ww.oeb.gov.on.ca/documents/edr_revidence_CCsubmission_130105.pdf> >, Pacific Economics Group, Madison Wisconsin, Jan. 12, 2005, 50 pages.

Simon, et al., "Supplementary Results For: Combining Static and Time Series Data to Determine the Quality of Expression Profiles In Time Series Experiments," accessible at <<www.cs.cmu.edu/~zivbj/compBio/SRChecksum.pdf>>, accessed prior to Feb. 2007, 6 pages.

Williams, "Profile Injection attack Detection for Securing Collaborative Recommender Systems1," accessible at <<http://facweb.cti.depaul.edu/research/TechReports/TR06-014.pdf>>, Depul University CTI Technical Report, Jun. 2006, pp. 1-47.

* cited by examiner

```
% Input:
% X = a T*n matrix: n columns of length T
% DT = length of the intervals on which each spline is defined
% degree = degree of the splines used for the approximation (1 or 2)
% constraint_degree = how many derivatives must match at boundary points
% (equal to the degree by default)
%
% Output:
% x = a smooth approximation of X
% sigma = an estimate of the standard deviation of X around x
% failures = in the case of L1L2 regression, this is an additional output
% that records which points were deemed anomalous.

function [x, sigma, failures] = spline_interpolate(X, DT, degree, constraint_degree)
[T,n] = size(X);
K = floor(T/DT);

if exist('constraint_degree', 'var')
    constraint_degree = min(constraint_degree, degree);
else
    constraint_degree = degree;
end % This part is common to all methods. B, B0, B1 are building blocks for the
% constraint matrix Aeq that ensures that the derivatives match at boundary
% points.

a = 2/(DT-1);
y = (-(DT-1)/2:(DT-1)/2)';
switch degree
    case 1
        B = [ones(DT,1), a*y];
        switch constraint_degree
            case 0
                B0 = zeros(0,2);
                B1 = B0;
            case 1
                B0 = [1, -a*DT/2];
                B1 = [1, a*DT/2];
        end
```

(FROM FIG. 13)

```
case 2
    B = [ones(DT,1), a*y, (a*y).^2];
    switch constraint_degree
        case 0
            B0 = zeros(0,2);
            B1 = B0;
        case 1
            B0 = [1, -a*DT/2, (a*DT/2)^2];
            B1 = [1, a*DT/2, (a*DT/2)^2];
        case 2
            B0 = [1, -a*DT/2, (a*DT/2)^2; 0, a, -2*a^2*(DT/2)];
            B1 = [1, a*DT/2, (a*DT/2)^2; 0, a, 2*a^2*(DT/2)];
    end
end
d = size(B,2);
r = size(B0,1);
C = sparse(K*DT, K*d);
for i=0:K-1
    C(DT*i + (1:DT), d*i + (1:d)) = B;
end x = zeros(K*DT,n);

% L2 / L1 regression:
    Aeq = sparse(r*(K-1), K*d);
    for i=0:K-2
        Aeq(r*i + (1:r), d*i + (1:2*d)) = [B1, -B0];
    end
    CC = C'*C;
    sigma = ones(1,n);
    tau = ones(1,n);
    failures = sparse(K*DT,1);
    for i=1:n
        fprintf('%d ', i);
        delta = 2e-5;   % failure probability (initial guess)
        Failures = [];  % list of failures (initial guess)
        DX = X(1:K*DT,i);
        b0 = C'*DX;
```

(FROM FIG. 14)

% Perform a number of (hard) Expectation Minimization steps:
    for j=1:10
        CF = C(Failures,:);
        H = [CC - CF'*CF, Aeq'; Aeq, sparse(r*(K-1),r*(K-1))];
        S = sign(DX(Failures,1)-x(Failures,i));
        b = b0 - CF'*DX(Failures,1) + (sigma(i)^2/tau(i)) * (CF'*S);
        v = H \ [b; sparse(r*(K-1),1)];
        x(:,i) = C*v(1:K*d);

1502 { 
        failure_log_prob = log(delta/(2*tau(i))) - abs(DX-x(:,i))/tau(i);
        normal_log_prob = log((1-delta)/sqrt(2*pi*sigma(i)^2)) - (DX-x(:,i)).^2/(2*sigma(i)^2);
        Failures = find(failure_log_prob > normal_log_prob);

sigma(i) = sqrt( (sum((DX-x(:,i)).^2) - sum((DX(Failures,1)-x(Failures,i)).^2) + 0.1)
                / (K*DT - length(Failures) + 0.1) );
        tau(i) = (sum(abs(DX(Failures)-x(Failures,i))) + 0.1) / (length(Failures) + 0.1);
    end
    failures(:,i) = sparse(Failures,1,1,K*DT,1);
end
fprintf('\n');

FIG. 15

STRATEGIES FOR IDENTIFYING ANOMALIES IN TIME-SERIES DATA

BACKGROUND

Many analysis tools monitor the behavior of an environment by analyzing time-series representations of the environment's key metrics. Consider a manufacturing process that employs one or more sensors. An analysis tool can assess the behavior of the manufacturing process by analyzing data generated by its sensors over a span of time (thus defining time-series data). Generally, an analysis tool can flag a dramatic change in the time-series data (e.g., a spike or a dip) as a potential malfunction within the environment.

In detecting spikes and dips, it is common to establish a model that defines the expected operation of the environment. For instance, an analysis tool may use various regression techniques to define a model that follows the general course of the measured time-series data. The analysis tool can then flag suspected anomalies by comparing each data point of the time-series data with the model. Large deviations are indicative of anomalies.

However, there are various challenges in properly detecting anomalies using the above-described approach. For instance, an environment may produce time-series data that is naturally noisy. This may make it difficult to define a model which accurately tracks the general course of the time-series data. Such difficulties may result in failing to identify actual anomalies, or in inaccurately labeling normal behavior as anomalous.

In addition to accuracy, in many monitoring environments, it is desirable to quickly identify anomalies soon after they occur. This may require an analysis tool to process a very large amount of data in a small amount of time, which, in turn, places certain constraints on the complexity of the algorithms used by the analysis tool. For instance, an algorithm may produce desirable accuracy with few false positives, yet may be too computationally complex to operate in a real-time manner. It is also desirable that the analysis tool scale well to evolving conditions within the environment being monitored.

In view of these illustrative factors, there is a need for effective strategies for detecting anomalies in time-series data.

SUMMARY

A strategy is described for identifying anomalies in time-series data. The time-series data may reflect any type of information collected from any type of environment. In one illustrative case, the time-series data may reflect traffic in a wide area network environment. In another illustrative case, the time-series data may reflect a flow of financial transactions. In another illustrative case, the time-series data may reflect data received from a physical sensor, and so on. In any case, the strategy can identify dramatic spikes and dips and/or or other deviant phenomena in the time-series data as potential anomalies.

The strategy operates by dividing the collected time-series data into a plurality of collected data segments. Then the strategy uses a modeling technique to fit a plurality of local models to the respective plurality of collected data segments. The term "local model" refers to a model of the local behavior of the time-series for a limited segment of time. In one case, the strategy can fit each local model subject to various constraints imposed by its neighboring local models. Considered in aggregate, the plurality of local models form a global model. The strategy identifies large differences between the collected time-series data and the global model as potential anomalies.

Given a space of models (such as a space of linear or n-polynomial models) the modeling technique can generate a local model to fit a data segment by choosing the model from the given space that minimizes a sum of error values. The error values correspond to differences between the model data and the collected time-series data. In a first exemplary approach, the modeling technique uses an absolute value (L1) measure of the error values to generate all of the local models. The L1 measure helps reduce the impact of Gibbs phenomenon. Gibbs phenomenon occurs when one or more outlying data points exert undue influence on the shape of the global model, potentially causing false positives and false negatives in the detection of anomalies in the time-series data.

In a second exemplary approach, the modeling technique uses the L1 measure only for portions of the time-series data that are projected to be anomalous. The modeling technique can use a squared-term (L2) measure of error values for portions of the time-series data that are projected to be normal. The strategy benefits from the use of the L2 measure for normal portions because it is more computationally efficient than the L1 measure. Moreover, a linear approximation can be used when performing computations based on the L1 measure (for those portions of the time-series data that are considered anomalous). This further expedites the processing.

In a third exemplary approach, the modeling technique uses an iterative procedure to generate the local models. For example, the modeling technique can use an expectation-maximization procedure. In an expectation phase of the procedure, the modeling technique labels each portion of the time-series data as anomalous or normal. An anomalous portion is associated with a Laplacian probability distribution, while a normal portion is associated with a Gaussian (Normal) probability distribution. In a maximization phase, the modeling technique generates parameters that define the local models. In doing so, the maximization phase performs a cost-minimizing operation using the L1 measure for anomalous portions and the L2 measure for normal portions (where such portions have been labeled in the preceding expectation phase). The next iteration of the expectation phase uses the newly generated local models as a reference in re-labeling portions of the time-series data as either anomalous or normal The modeling technique repeats the above-described procedure for a predefined number of times or until it produces stable labeling results.

The strategy confers a number of benefits. According to one exemplary benefit, the strategy can provide reliable results in a computationally-efficient manner. This aspect makes the strategy suitable for the real-time analysis of large quantities of data. The strategy can be effectively used to analyze problems in a wide area network environment.

Additional exemplary implementations and attendant benefits are described in the following.

BRIEF DESCRIPTION OF THE DRAWINGS

FIGS. 13-15 collectively show computer instructions that can be used to implement the system of FIG. 1 according to one exemplary implementation.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for detecting anomalies in time-series data. The strategy can be manifested in various systems, apparatuses, modules, procedures, storage mediums, data structures, and other forms.

This disclosure includes the following sections. Section A describes an exemplary system for detecting anomalies in time-series data. Section B describes exemplary procedures that explain the operation of the system of Section A.

A. Exemplary System

As a preliminary note, any of the functions described with reference to the figures can be implemented using software, firmware, hardware (e.g., fixed logic circuitry), manual processing, or a combination of these implementations. The term "logic," "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including machine-readable storage media encompassing various kinds of storage devices (magnetic, optical, static, etc.), and machine-readable communication media encompassing transitory forms for representing information, including various hardwired and/or wireless links for transmitting the information from one point to another.

A.1. System Overview

Figure 1:
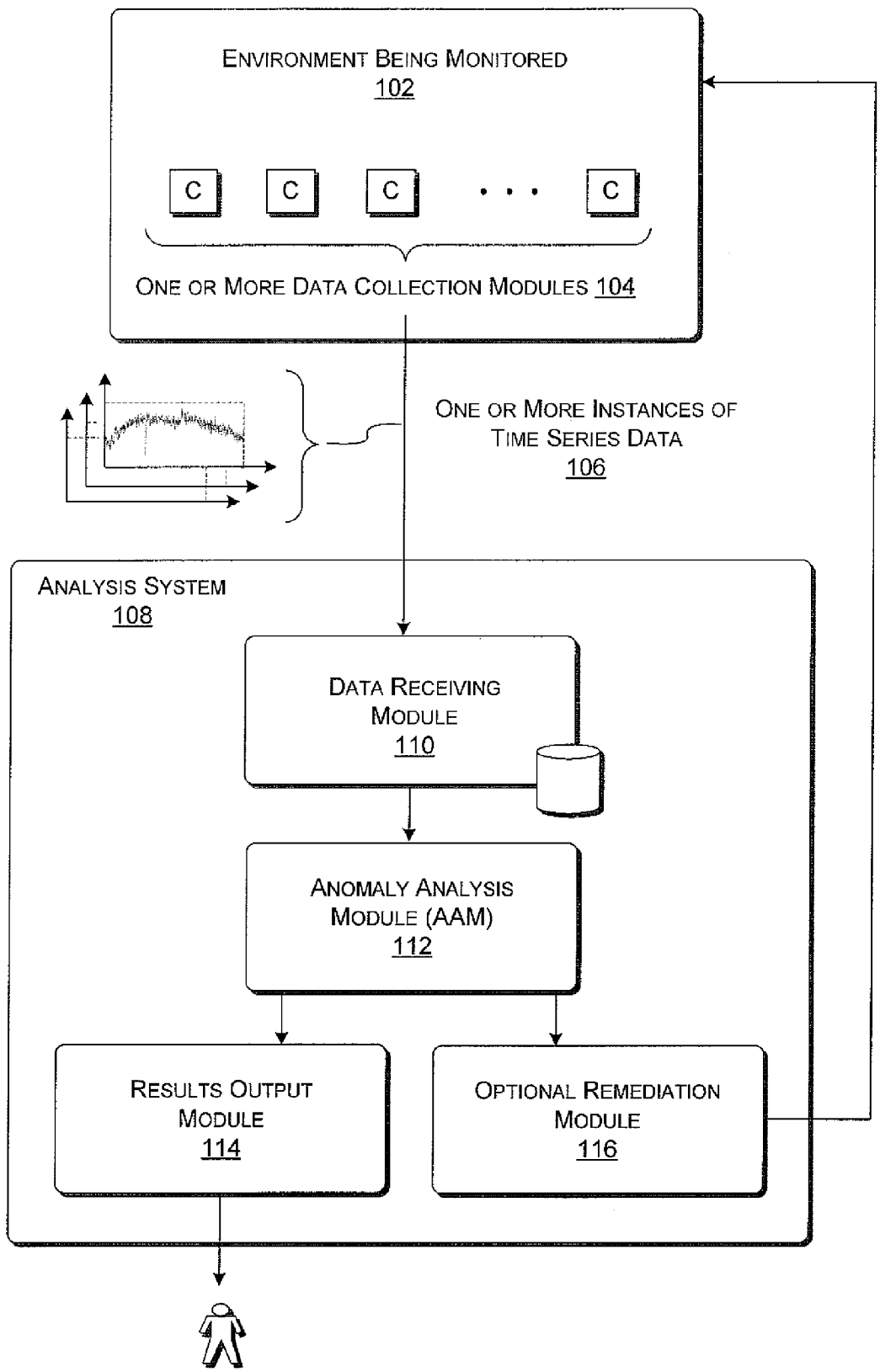
FIG. 1 shows an exemplary system for detecting anomalies in any type of environment being monitored.

FIG. 1 shows one exemplary framework for detecting anomalies in time-series data in any kind of environment 102 being monitored. The term "time-series data" refers to data that describes the behavior of the environment 102 over the course of time. The time-series data may sample the behavior at fixed or irregular intervals of time, or some combination thereof The term "anomaly" is intended to have broad connotation. An anomaly represents an event that departs in some noted way from a general or expected trend in the time-series data. In a classic case, an anomaly may be associated with a dramatic change in the course of the time-series data, such as an upward spike or downward dip. In most of the examples presented here, an anomaly is associated with the improper functioning of the environment 102. But in other cases, an anomaly may be associated with a desirable event.

Figure 2:
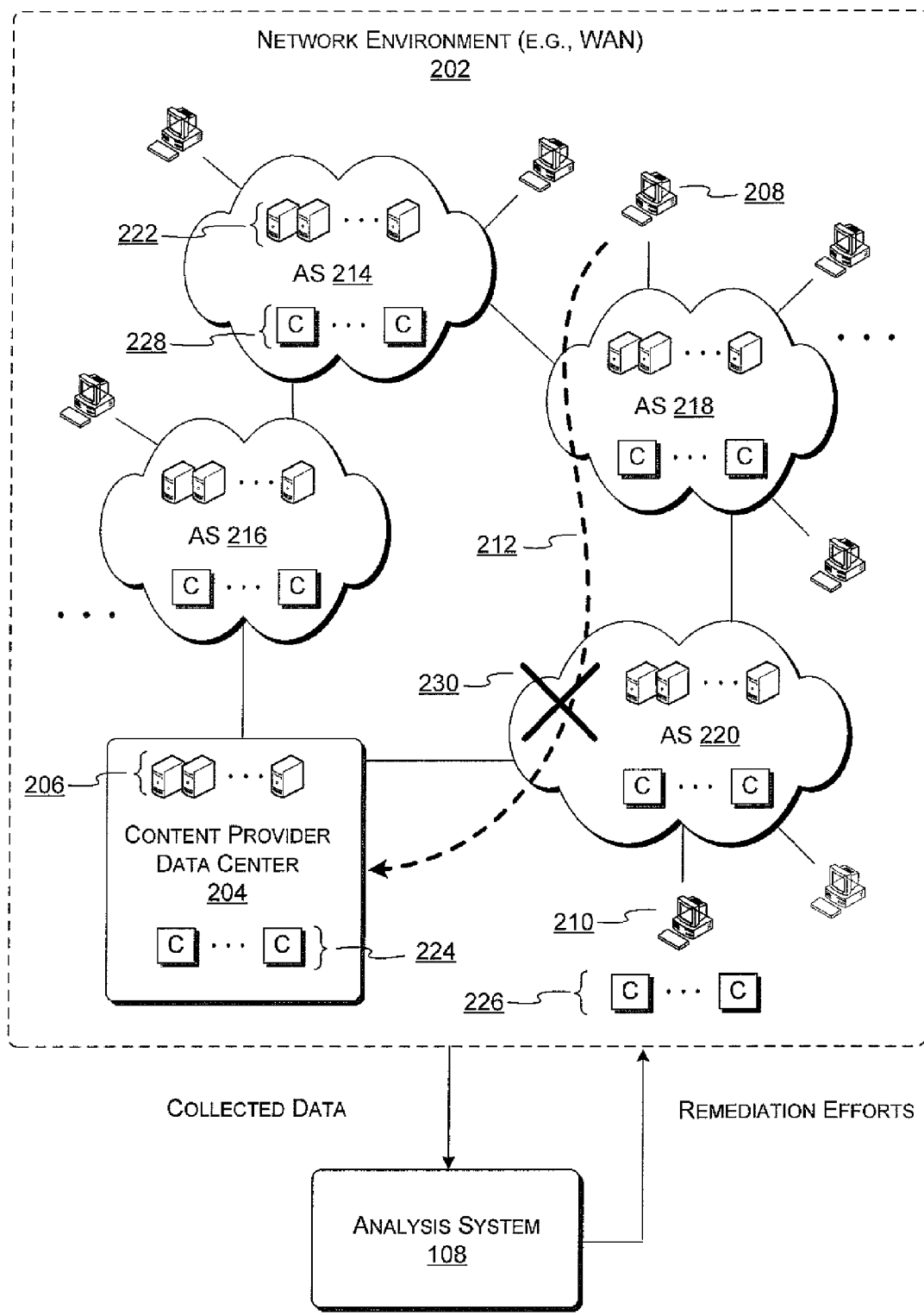
FIG. 2 shows an exemplary application of the system of FIG. 1 to the detection of traffic anomalies in a network environment.

The environment 102 can represent any target of monitoring activity. In one case, the environment 102 may correspond to any setting that includes one or more sensors. The sensors can generate time-series data that reflects changes in the physical characteristics of the environment 102. For example, the environment 102 may correspond to a room, machine, process, etc., having temperature sensors, motion sensors, pressure sensors, and so on. In another case, the environment 102 may correspond to a financial system or business process. This environment 102 can generate time-series data that reflects a stream of financial transactions. In another case, the environment 102 may correspond to an electrical data processing device. Such an environment 102 may generate time-series data that reflects the memory consumption of the device, the processing speed of the device, and so on. In another case, the environment 102 may correspond to a network setting. Such an environment 102 may exhibit behaviors that can be monitored to provide time-series data reflecting processing loads experienced by different components in the network environment, the flow of messages exchanged among components, and so forth. FIG. 2, to be described in the subsection A.2 (below), provides additional details regarding a monitoring operation that can be conducted in one network-related environment. The environment 102 can be or represent yet other types of environmental settings.

In any event, the environment 102 may provide the time-series data using one or more collection modules 104. The collection modules 104 monitor or measure the behavior(s) of the environment 102. The collection modules 104 can correspond to one or more physical sensors, one or more data collection logs, a manual data collection operation, and so on. The collection modules 104 produce one or more instances of time-series data 106. Each instance of the time-series data identifies some measured variable relative to the passage of time. More specifically, the time-series data 106 may include one or more fields that describe or indicate the value of the variable being monitored. For example, time-series data that reflects temperature within the environment 102 can include a field that identifies temperature measurements. Measured values of a variable can be expressed in numerical form. Alternatively, or in addition, the measured values can be expressed as a discrete set of values which can be converted into numerical form for analysis. The time-series data can also include one or more timestamp fields that identify that time at which the data has been collected (unless this timing information can be inferred, e.g., as in the case in which the data is collected at fixed intervals of time).

An analysis system 108 detects anomalies in the time-series data 106. To perform this function, the analysis system 108 includes several modules, enumerated below.

The analysis system 108 includes a data receiving module 110 to receive the time-series data 106 from the environment 102 being monitored. The data receiving module 110 can operate using a push model, a pull model, or some combination of a push model and pull model. That is, the data receiving module 110 can passively receive data that is transmitted to it by the environment 102, actively receive the data by polling the environment 102, or by using some combination of passive receipt and active polling. The data receiving module 110 can optionally translate received values into a form usable by the analysis system 108. Such translation can include, but is not limited to, any one of or combination of: translation of format; translation of discrete values into numerical values; conversions of units, and so on. The data receiving module 110 can store the collected data 106 in one or more data stores prior to analysis.

An anomaly analysis module (AAM) 112 receives the time-series data 106 from the data receiving module 110 and detects anomalies within this data 106. Section B (below) describes exemplary techniques that the AAM 112 can employ to detect anomalies.

A result output module 114 conveys an output of the AAM 112. For example, the result output module 114 can display a graph which plots the time-series data 106. The output module 114 can indicate, such as by graphically marking, potential anomalies within the data 106. In addition, or alternatively, the result output module 114 can provide a tabular output, indicating potential anomalies within a textual representation of the data 106 in any suitable manner, e.g., by highlighting information, changing the size or color of the information, and so on. The result output module 114 can produce yet other types of output presentations, including non-visual (e.g., audio) types of presentations. The output can also be stored for later retrieval in any manner.

An optional remediation module 116 can perform any type of action based on identified anomalies. For example, the remediation module 116 can take corrective action within the environment 102 based on the output of the AAM 112. Consider the case in which the environment 102 is a process within a manufacturing plant. The remediation module 116 can change the behavior of the process to reduce the occurrence of the type of anomalies detected by the AAM 112.

A.2. Application to Detection of Anomalies in a Network Environment

FIG. 2 shows an application of the analysis system 108 of FIG. 1 to monitoring the behavior of a network environment 202.

The network environment 202 can allow a plurality of client devices to interact with one or more content providers. That is, a client device may interact with a content provider to receive content from the provider, or more generally, to receive any service(s) being offered by the content provider. In one case, the content provider may receive searches from the client devices, and, in return, supply search results and other content to the requesting client devices.

The network environment 202 shows a representative content provider data center 204. The content provider data center 204 may administer the services provided by the content provider in conjunction with various distribution nodes (not shown). The content provider data center 204 can include one or more server computers 206, data storage devices, routers, and/or other data processing equipment. Although not shown, the content provider data center 204 may organize its resources in conventional fashion as a collection of front-end resources (with which the users directly interact) and a collection of back-end resources.

The network environment 202 shows a collection of client devices, including representative client device 208 and representative client device 210. The client devices can generally correspond to any type of data processing device through which users may gain access to the network environment 202. FIG. 2 illustrates the client devices as personal computers, but the client devices can also correspond to personal digital assistant (PDA) devices, stylus-type input devices, mobile telephone devices, set-top box devices, game console devices, and so on. The client devices need not be the same; they can differ. As shown, representative client device 208 is attempting to interact with the content provider data center 204 (via connection 212). For example, the representative client device 208 may generate an HTTP request to retrieve information from the content provider data center 204.

The network environment 202 may correspond to the Internet or some other wide area network. As such, the network environment 202 can integrate a large number of component networks. The term "component network" generally refers to network-related functionality that is a part of the more encompassing network environment 202. For example, as broadly used herein, a network component may correspond to any kind of communication system, an Internet Service Provider (ISP) or any other network provider, an Autonomous System, an administrative domain, and so forth. The network components can be administered by different respective entities. Further, many of the network components can be considered independent in the sense that they are not generally under the direct control of the content provider. Each network component may include any type of data processing equipment, such as one or more server computers, data stores, data routers and so forth. FIG. 2 specifically illustrates four representative network components (214, 216, 218, and 220), although it will be appreciated that an actual network environment may include many more such network components. Representative network component 214 includes one or more server computers 222.

The network environment 202 can include various data collection modules (denoted by the letter "C") dispersed throughout the network environment 202. For example, the content provider data center 204 can include zero, one or more collection modules 224. Any client device can include one or more data collection modules; for instance, representative client device 210 includes zero, one or more data collection modules 226. Any network component can also include one or more data collection modules; for instance, representative network component 214 includes zero, one or more data collection modules 228. Still other components or locations within the network environment 202 may include data collection modules.

In the network environment 202, a data collection module may comprise any functionality for monitoring the behavior of some aspect of the environment 202. Each data collection module may have a unique vantage point as to what is happening in the network environment 202. Accordingly, each data collection module may be able to monitor different types of events. For example, a data collection module can monitor any combination or permutation of: messages being sent, received, forwarded, processed, stored, and so on. A data collection module can log salient information regarding an identified message, such as information which identifies the type of message that has been detected, information which identifies the time at which the message was sent and/or received (or information which identifies any other action that was performed on or by the message), information which identifies any explicit status information associated with the message, and so forth.

In one case, the data collection modules may provide information which reveals a flow of message traffic through the network environment 212. For example, the data collection modules can provide information regarding the number of messages that have been transmitted by any component, forwarded by any component, received by any component, and so on.

In addition to information that is directly communicated by the data collection modules, the network environment 202 or the analysis system 108 can infer other behavior of the network environment 202. For example, the analysis system 108 can collect historical data that reflects the usual manner of operation of certain parts of the network environment 202. If the network environment 202 becomes inactive relative to past performance, the analysis system 108 can record one or more events that identify this discrepancy. These are negative events in the sense that they register occurrences which should have happened (but have not).

The analysis system 108 can receive the time-series data generated by the various data collection modules. The analysis system 108 can identify anomalies in this time-series data. In one case, the analysis system 108 can combine the results of different data collection modules to form aggregated time-series data. This aggregating operation may involve removing redundant data that has been logged by multiple data collection modules. Alternatively, or in addition, the analysis system 108 can perform independent analysis on different streams of time-series data collected at different points in the network environment 202. Due to its efficiency (to be described below), the analysis system 108 can perform analysis on multiple instances of the time-series data at the same time (e.g., in parallel).

According to one approach, the analysis system 108 may attempt to determine anomalies (e.g., spikes and/or dips) in message traffic within the network environment 202. Spikes and dips may be indicative of anomalous behavior because a network environment characterized by heavy traffic volume is typically expected to vary in a relatively slow manner. A dip in traffic may be attributed to various causes. For example, one or more network components may not be functioning in a proper manner. For instance, FIG. 2 shows that network component 220 may be malfunctioning, thus preventing (as per "blockage" 230) client requests from reaching the content provider data center 204. Alternatively, or in addition, browser functionality of other local functionality employed by client devices may be functioning in an improper manner. Alternatively, or in addition, functionality at the content provider data center 204 (and/or at its associated distribution nodes) may be functioning in an improper manner. A spike in traffic may also be attributed to various causes. For example, an upward spike may indicate that a malicious entity is attacking part of the network environment 202 by generating a flood of messages. For example, an automated program may be generating these messages in a denial-of-service type of attack.

Upon detecting one or more anomalies within the network environment 202, the analysis system 108 can take various types of remedial action. For example, the analysis system 108 can directly make changes in one or more network components to correct any problems in those components. In addition, or alternatively, the analysis system 108 can simply notify network components of anomalies, allowing these components to independently take corrective action. This might be appropriate where the network components that are responsible for the anomalies are not under the direct control of the entity that administers the analysis system 108.

Consider the case in which the content provider administers the analysis system 108 for its own use. The content provider may be particularly concerned with detecting anomalies in the services it renders, even if those problems are the result of network components and other functionality that it has relatively no control over. These anomalies may lead to the loss of revenue, as customers are prevented from accessing the content provider's services. Moreover, if services are blocked, advertisers cannot disseminate ads to customers through these services.

A.3. Exemplary Processing Functionality

Figure 3:
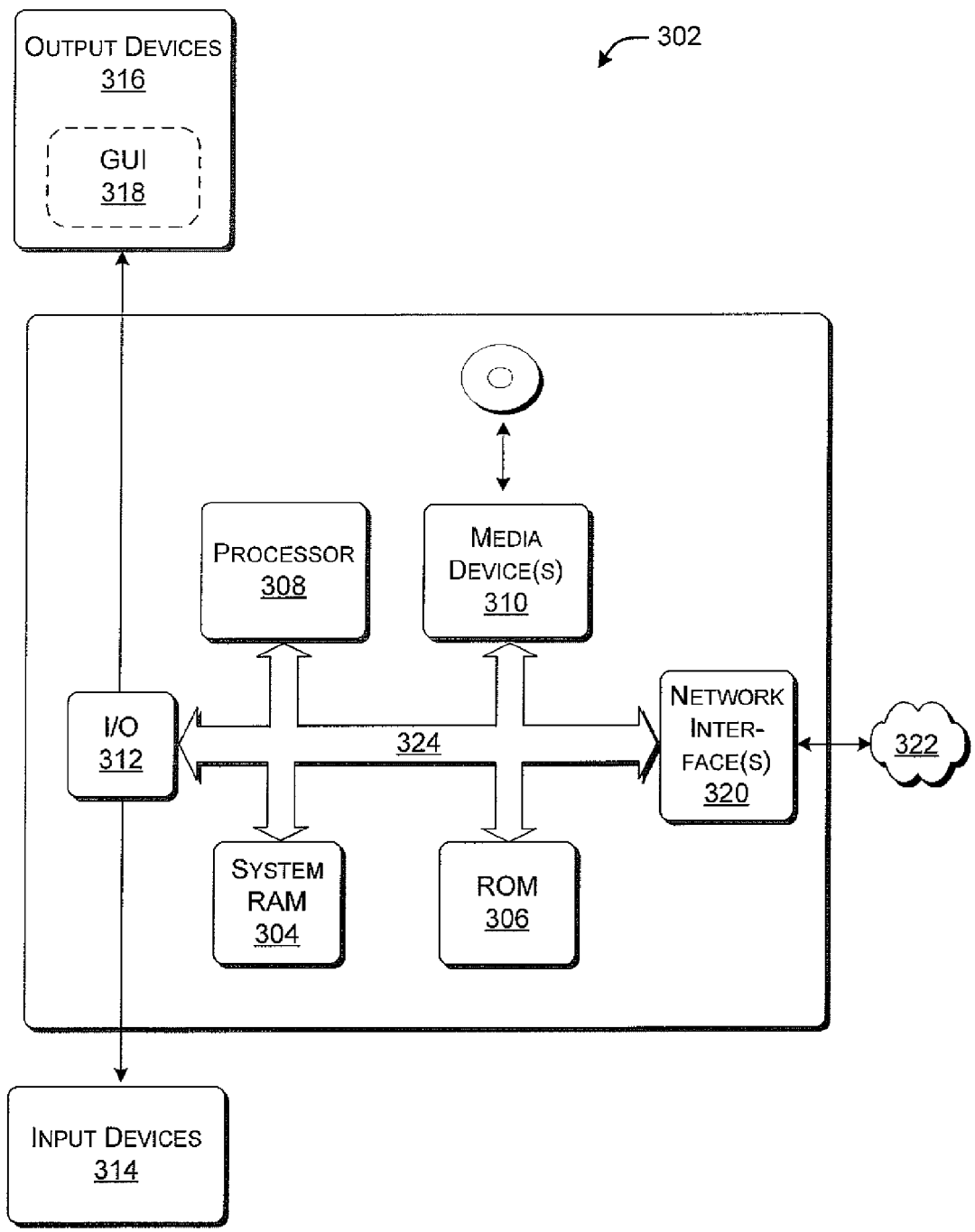
FIG. 3 shows exemplary processing functionality that can be used to implement any aspect of the system of FIG. 1.

FIG. 3 sets forth exemplary processing functionality 302 that can be used to implement any aspect of the infrastructure shown in FIGS. 1 and 2. In one non-limiting case, for instance, the processing functionality 302 may represent any computer machine used to implement any aspect of the analysis system 108. The processing functionality 302 can also represent any computer machine used in the general environment 102 of FIG. 1 or the network environment 202 of FIG. 2. For instance, in the case of the network environment 202 of FIG. 2, the processing functionality 302 can be used to implement a user's client computer, a server computer in the content provider data center 204, a server computer in a network component, and so on.

The processing functionality 302 can include various volatile and non-volatile memory, such as RAM 304 and ROM 306, as well as one or more central processing units (CPUs) 308. The processing functionality 302 can perform various operations identified above when the CPU 308 executes instructions that are maintained by memory (e.g., 304, 306, or elsewhere). The processing functionality 302 also optionally includes various media devices 310, such as a hard disk module, an optical disk module, and so forth.

The processing functionality 302 also includes an input/output module 312 for receiving various inputs from the user (via input devices 314), and for providing various outputs to the user (via output devices 316). One particular output device may include a display apparatus and an associated graphical user interface (GUI) 318. The processing functionality 302 can also include one or more network interfaces 320 for exchanging data with other devices via one or more communication conduits 322. One or more communication buses 324 communicatively couple the above-described components together.

The communication conduits 322 can be implemented in different ways to suit different technical and commercial environments. For instance, the communication conduits 322 can include any kind of network (or combination of networks), such as a wide area network (e.g., the Internet), an intranet, Digital Subscriber Line (DSL) network infrastructure, point-to-point coupling infrastructure, and so on. In the case where one or more digital networks are used to exchange information, the communication conduits 322 can include various hardwired and/or wireless links, routers, gateways, name servers, and so on. The communication conduits 322 can be governed by any protocol or combination of protocols. (In the context of FIG. 2, the communication conduits 322 may loosely represent a wide area network, such as the Internet.)

B. Exemplary Procedures

FIGS. 4-7 show various procedures which explain the operation of the analysis system 108 of FIG. 1 in flow chart form. To facilitate discussion, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

B.1. Overview of Entire Process

Figure 4:
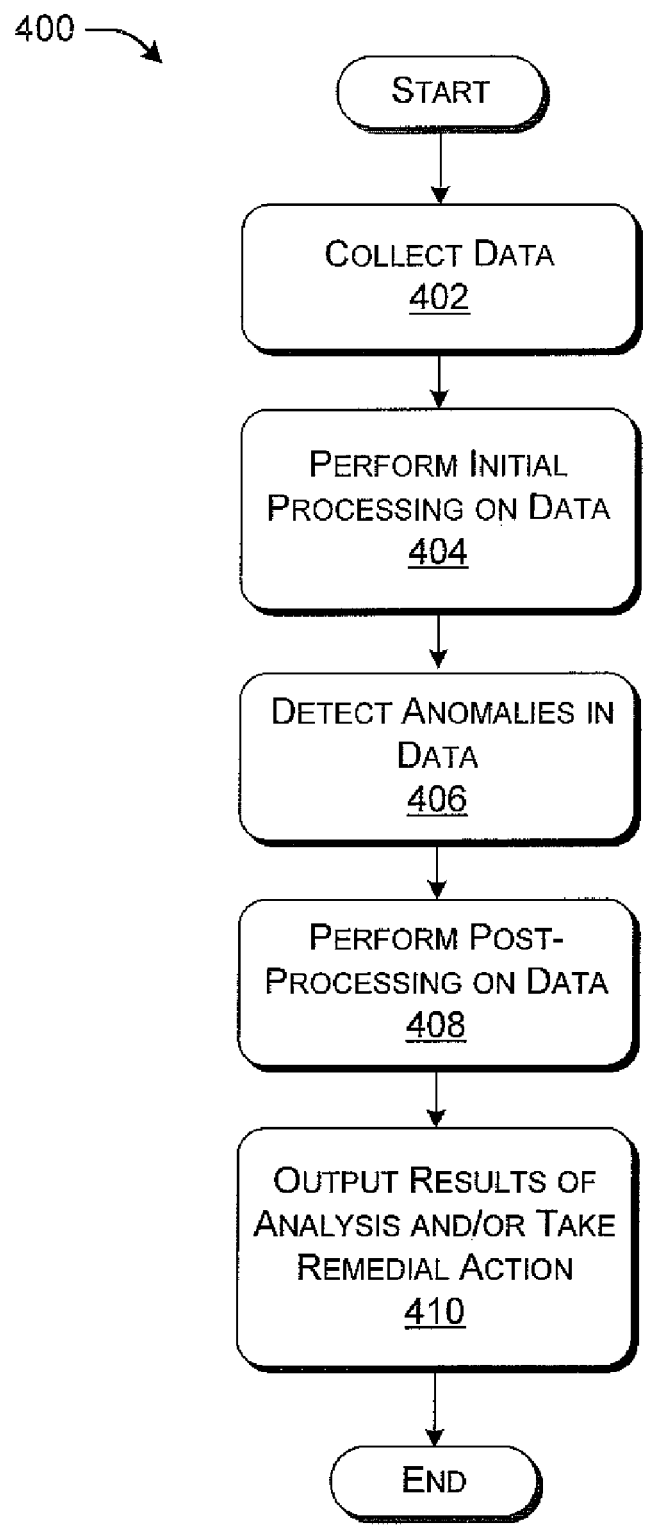
FIG. 4 shows an overview of an exemplary procedure for detecting anomalies.

FIG. 4 is a procedure 400 which provides an overview of the operation of the analysis system 108 of FIG. 1.

In operation 402, the data receiving module 110 receives time-series data from the environment 102, either in a passive manner, an active manner, or in some hybrid passive-active manner.

In operation 404, the anomaly analysis module (AAM) 112 or some other module can optionally perform pre-processing on the collected time-series data. For example, consider the case in which the collected time-series data reflects traffic within the network environment 202. The pre-processing operation 404 may involve taking the square root of the collected data. This may be useful in some circumstances to help normalize variance across the peaks and valleys of the time-series data.

In operation 406, the AAM 112 determines the presence of any anomalies in the time-series data. Later figures describe this process in greater detail.

In operation 408, the AAM can optionally perform post-processing on the output of operation 406. The post-processing may complement the pre-processing performed in operation 404. For example, the post-processing may involve squaring the results of operation 406.

In operation 410, the result output module 114 outputs the results of the procedure 400. The results may comprise a graphical depiction of the time-series data, with anomalous events appropriately marked. Alternatively, or in addition, the results may comprise a tabular presentation of alphanumeric data or some other information.

The procedure 400 can be performed for each instance of time-series data. Each instance of time-series data may reflect the output of a single data collection module, or perhaps the aggregate of outputs provided by a group of data collection modules. The AAM 112 can optionally perform analysis on multiple instance of time-series data at the same time, e.g., in parallel. This facilitates the rapid detection of anomalies within a data-rich environment, such as the network environment 202 of FIG. 2.

B.2. Overview of Analysis

Figure 5:
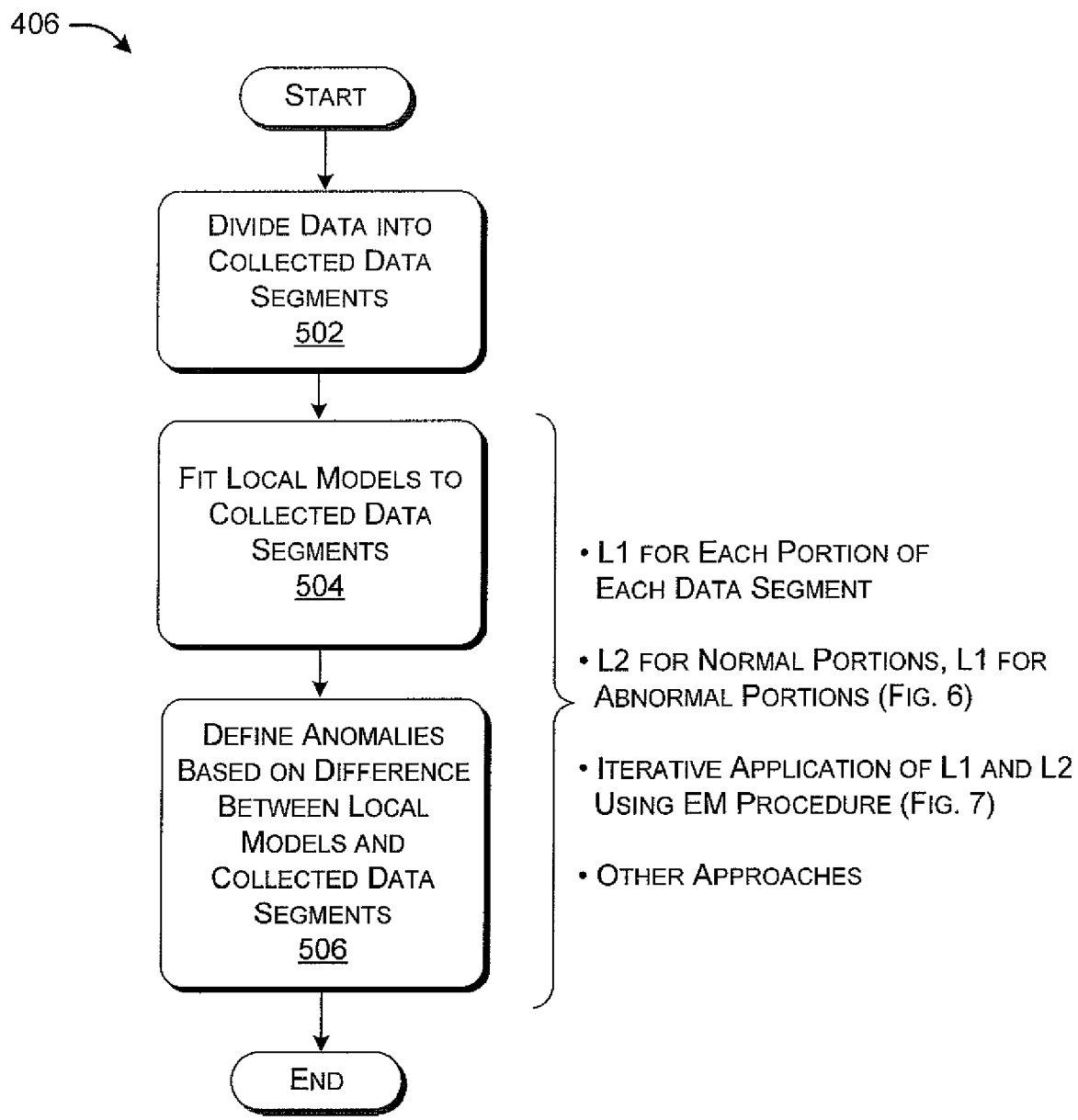
FIG. 5 shows one exemplary procedure for analyzing time-series data collected using the procedure of FIG. 4.

FIG. 5 is a procedure that provides an overview of the anomaly analysis operation 406 of FIG. 4. To facilitate explanation, it will be assumed that the operations outlined in FIG. 4 are performed on a single instance of time-series data. But as stated above, the AAM 112 can perform this analysis on multiple instances at the same time.

In operation 502, the AAM 112 divides the collected time-series data into multiple segments, referred to herein as "collected data segments." Operation 502 may allow the user to specify the duration of the data segments. It is preferable to set the length of the data segments to be short enough to facilitate accurate modeling, yet not so short that normal behavior cannot be distinguished from abnormal behavior. For frame of reference, without limitation, one exemplary implementation can set the length of the data segments to 60 minutes (although any shorter or longer interval can be used).

In operation 504, the AAM 112 fits "local models" to the plurality of respective collected data segments. The term "local model" refers to a model of the local behavior of the time-series for a limited segment of time. The purpose here is to select local models which track the general path of the collected data segments, subject to certain boundary conditions to be discussed below. In one case, the AAM 112 can use regression to generate the local models. More specifically, the AAM 112 can use a spline curve fitting technique to generate the local models, where each local model corresponds to a polynomial. Operation 504 may allow the user to define the degree of the local models to be fit to the collected data segments. For instance, a user may select the degree as one of linear, quadratic, cubic, etc. Considered in aggregate, the plurality of local models form a "global model." In other words, a "global model" refers to a plurality of local models, where the global model combines the predictions of one or more local models (e.g., via concatenating the local models in the time dimension).

In operation 506, the AAM defines anomalies in the collected time-series data by detecting dramatic deviations between the collected time-series and the global model. A dramatic spike in message traffic may be indicative of a message-generating attack by an automated program within the network environment 202. A dramatic dip in message traffic may be indicative of one or more parts (e.g., network components) of the network environment 202 that are no longer working properly.

Jumping ahead momentarily in the sequence of figures, FIGS. 8-11 show how procedure 406 acts on representative time-series data. To facilitate discussion, these figures show how linear local models are fitted to the collected time-series data. However, the same principles conveyed by these figures can be applied to the case in which higher order local models are fitted to the time-series data.

Figure 8:
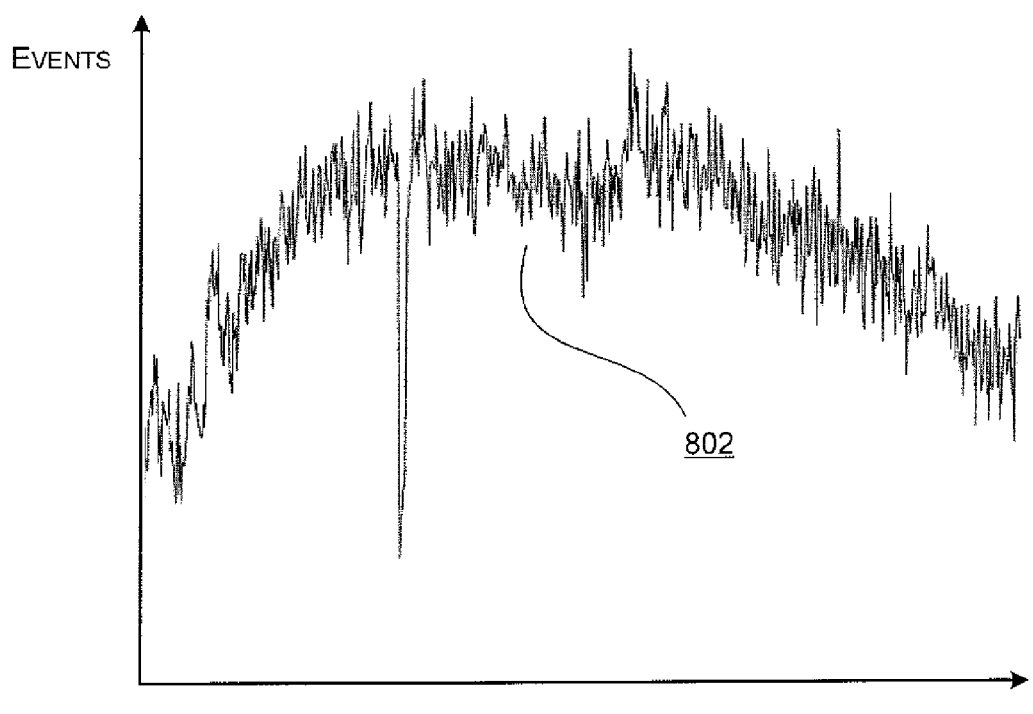
FIGS. 8-11 illustrate the fitting of local models to time-series data, and the use of the L1 measure to reduce the effects of Gibbs phenomenon.

To begin with, FIG. 8 shows collected time-series data 802. This data 802 may be supplied by one or more data collection modules within any kind of environment, such as, but not limited to, the network environment 202. In this context, the vertical axis may represent message traffic within the network environment 202, or some part thereof In accordance with operation 502, the time-series data 802 is divided into a plurality of contiguous collected data segments, as shown in FIG. 9.

Figure 9:
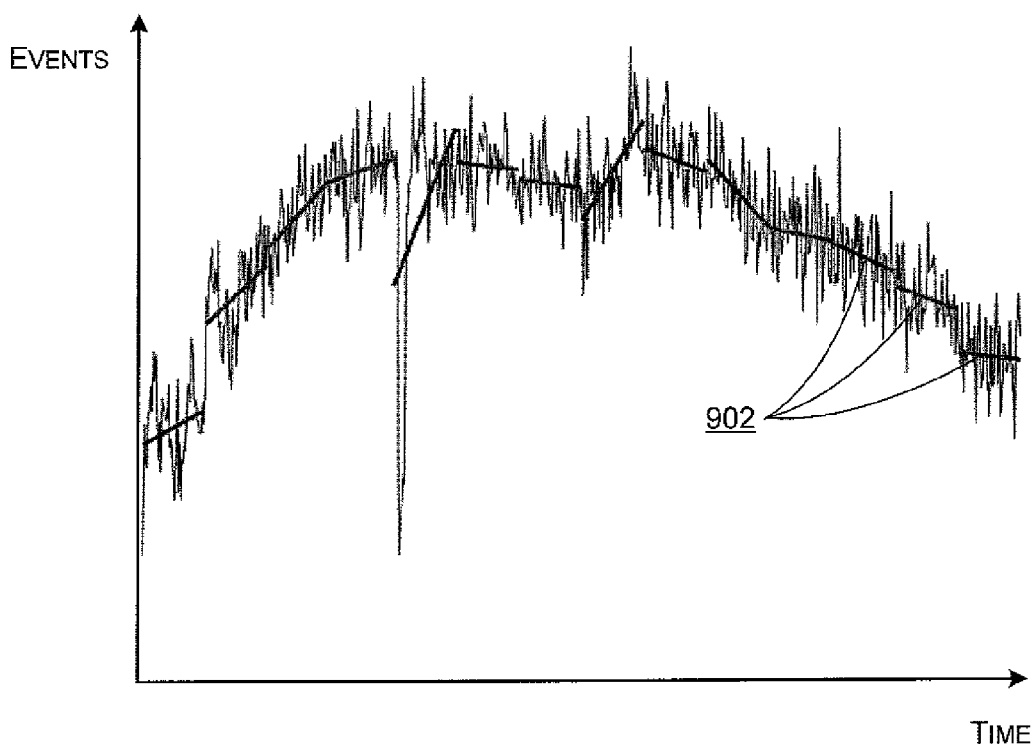
Figure 10:
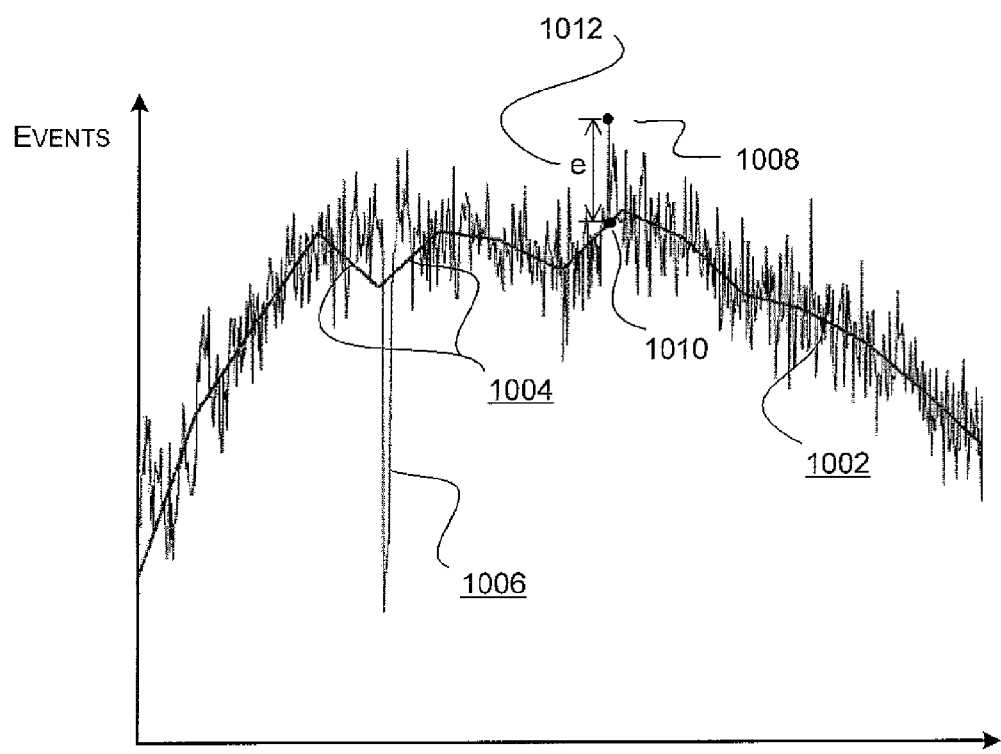

FIG. 9 shows, for tutorial purposes, how the AAM 112 would hypothetically fit local models to the collected data segments without any constraints imposed by boundary conditions. Segments 902 are three representative consecutive local models. Without boundary conditions, the endpoints of the local models do not necessarily connect together. In actual practice, a user can constrain the local models to ensure that the endpoints connect together. Further, the user can constrain the local models to ensure that the derivatives of the endpoints match up, which produces smoother transition points from one local model to the next. More specifically, the user can specify the order of derivative that is required to match at the endpoints, e.g., first derivative, second derivative, etc. FIG. 10 shows fitting performed by the AAM 112 when boundary conditions are applied. As a result, the local models now form a continuous global model 1002, e.g., without abrupt transitions from one local model to the next.

FIG. 10 also shows a marked deviation 1004 in the global model 1002. The AAM 112 produces this deviation 1004 because it is attempting to fit one or more local models to a collection of time-series data that contains one or more outlying data points 1006. These data points 1006 are outlying in the sense that they markedly depart from the general trend of the time-series data. While it is appropriate that the global model 1002 should track the actual time-series data, in this case, the outlying data points 1006 have exerted undue influence on the global model 1002, drawing it too far downward. Because of this, the global model 1002 no longer accurately models the collected time-series data that occurs just before and after the outlying data points 1006. This type of behavior is referred to as the Gibbs phenomenon. As an ultimate result, the Gibbs phenomenon may result in normal parts of the time-series data being labeled an anomalous (and/or, potentially, vice versa).

The Gibbs phenomenon may ensue, in part, from the modeling paradigm that is applied by the AAM 112. By way of introduction, an error value defines a difference between a point in the collected time-series data and a corresponding point in the global model. For example, the difference between illustrative collected data point 1008 and model point 1010 defines an error value 1012. For each local model, the AAM 112 generally operates by minimizing a sum of the error values to choose a final path of the model. In performing this operation, the AAM 112 can rely on various ways of representing the error values. In a first technique, the AAM 112 can use a square of the error values. This representation is referred to herein as a squared-term (L2) measure. In a second technique, the AAM 112 can use an absolute value of an error values. This representation is referred to herein as an absolute value (L1) measure. Although the use of L1 and L2 measures are described in detail herein, other ways of representing or estimating error values can be used.

There are certain advantages and disadvantage to both the L2 measure and the L1 measure. One advantage of the L2 measure is that it allows modeling to be performed in a relatively efficient manner, e.g., by solving a system of linear equations. One disadvantage of the L2 measure is that it is not robust to outliner values in the time-series data, and is thus prone to the type of Gibbs phenomenon illustrated by the deviation 1004 of FIG. 10. One advantage of the L1 measure is that it is robust to outliner values in the time-series data and thus reduces the effects of the Gibbs phenomenon. One disadvantage of the L1 measure is that it is more computationally complex to use in modeling (compared to modeling using the L2 measure, which can use a linear technique). This is because the L1 introduces nonlinear computations into the modeling operation.

Figure 11:
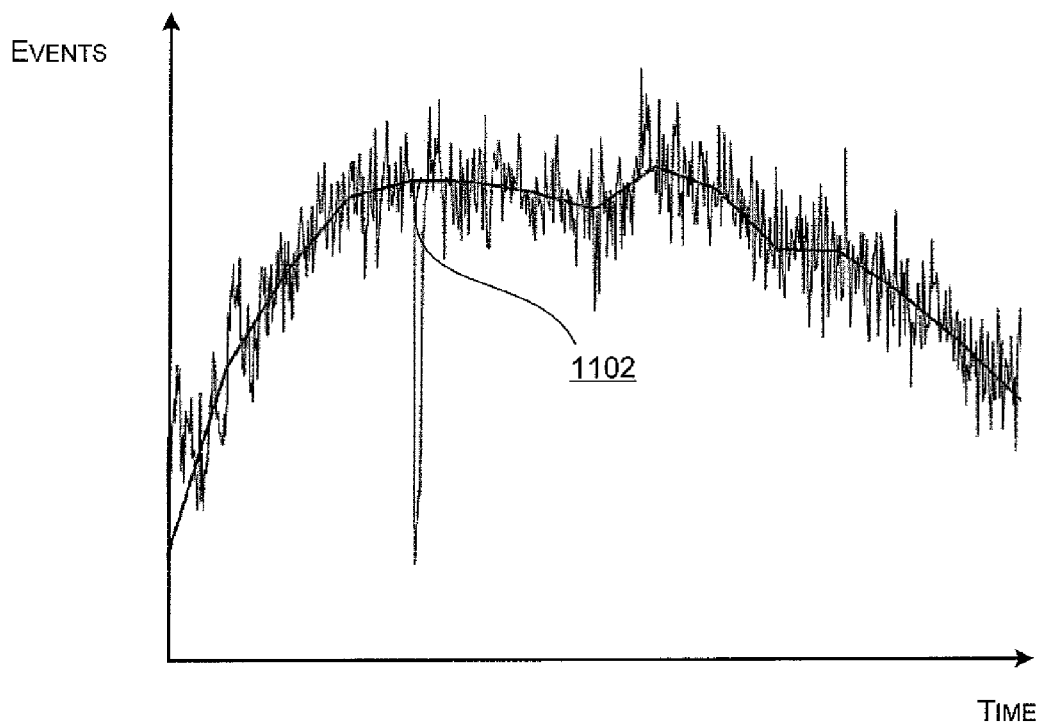

FIG. 11 shows what happens when the AAM 112 uses the L1 measure to generate all of the local models that compose the global model 1002. As noted in region 1102 of FIG. 11, the choice of L1 helps reduce the deviation 1004 of FIG. 10 associated with the Gibbs phenomenon.

Returning to FIG. 5, the procedure 406 indicates that the AAM 112 can choose from among several different modeling techniques in performing operations 504 and 506.

In a first technique, the AAM 112 can use the L1 measure in generating all portions of all of the fitted local models, instead of the L2 measure. As explained above, one advantage of this approach is that it reduces the Gibbs phenomenon. One disadvantage of this technique is that it is more computationally complex than the use of the L2 measure, and therefore may potentially slow the processing performed by the AAM 112.

Figure 6:
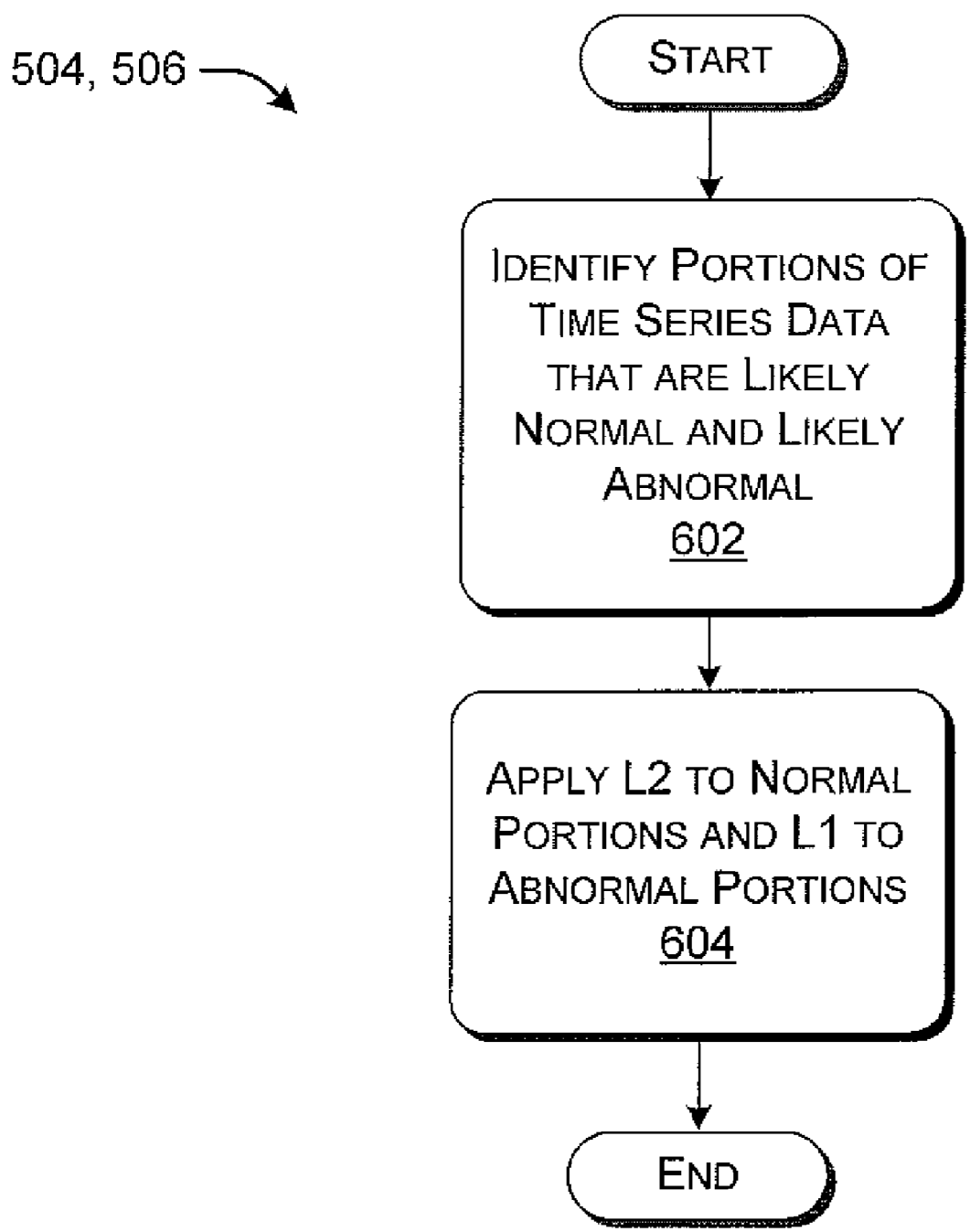
FIG. 6 shows one exemplary procedure for generating a global model in the procedure of FIG. 5 using a combination of L1 and L2 measures.

In a second technique, the AAM 112 can use the L1 measure, but only for those portions of the time-series data that are likely to represent anomalous events (as described more fully in the context of FIG. 6 below). In the remaining portions, which likely represent normal behavior, the AAM 112 can use the L2 measure. This has the dual advantage of reducing the Gibbs phenomenon in those areas where it is likely to manifest itself (e.g., in anomalous areas), while not otherwise slowing the AAM 112 by using the L1 measure in normal areas where the Gibbs phenomenon is not typically a problem. To further expedite processing, the AAM 112 can use a linear approximation of the absolute value function in the regions in which L1 is applied. FIG. 6, to be described below in turn, provides additional detail regarding the second technique.

Figure 7:
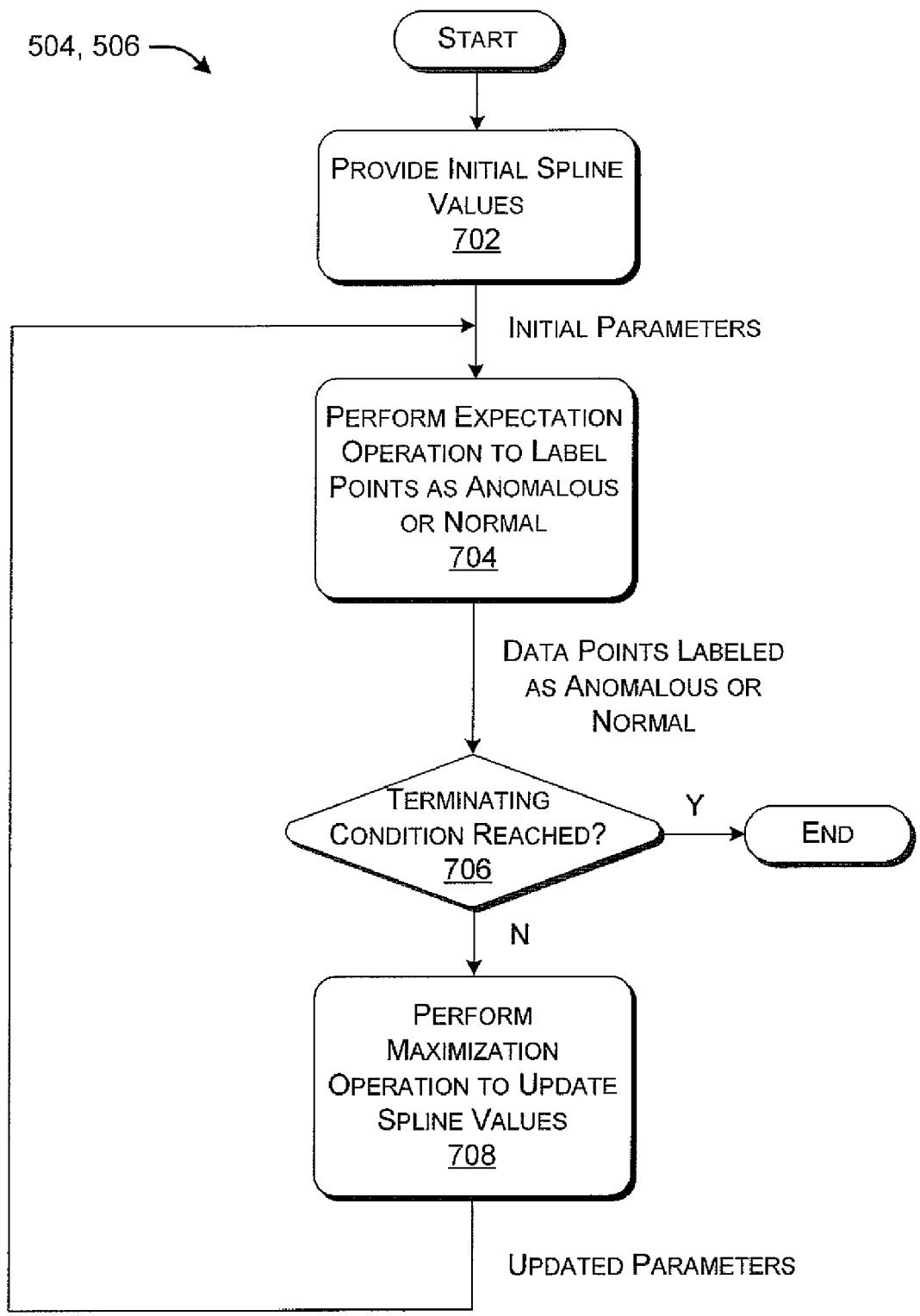
FIG. 7 shows an exemplary variation of the procedure of FIG. 6, in which an expectation-maximization approach is used to iteratively determine how the L1 and L2 measures are to be applied in generating the global model.

In a third technique, the AAM 112 can use an expectation-maximization iterative procedure to apply a mixture of the L1 measure and the L2 measure in generating the global model (as described more fully in the context of FIG. 7 below). In an expectation phase of the procedure, the AAM 112 labels each portion of the time-series data as anomalous or normal. An anomalous portion is associated with a Laplacian probability distribution, while a normal portion is associated with a Gaussian (Normal) probability distribution. In other words, abnormal points are assumed to fall around a local model with a Laplacian probability distribution and normal points are assumed to fall around the local model with a Gaussian probability distribution. Hence, the AAM 112 can classify whether each portion is anomalous (or not) based on the probability distribution under which the portion is more likely. In a maximization phase, the AAM 112 generates parameters that define the plurality of local models. In doing so, the maximization phase performs a cost-minimizing operation using the L1 measure for anomalous portions and the L2 measure for normal portions (where such portions have been labeled in the preceding expectation phase). The next iteration of the expectation phase uses the newly generated local models as a reference in re-labeling portions of the time-series data as either anomalous or normal. The modeling technique repeats the above-described procedure for a predefined number of times or until it produces stable labeling results. FIG. 7, to be described below in turn, provides additional detail regarding the third technique.

The second and third techniques are instances of one general mode of operation of the AAM 112. According to this mode, the AAM 112 can choose among multiple curve-fitting paradigms in modeling different portions of the time-series data (not limited to two paradigms). The AAM 112 examines the characteristics of each portion of the time-series data and applies, in dynamic fashion, the curve-fitting paradigm deemed most suitable for that portion. For instance, in the specific examples identified above, the AAM 112 uses an error value metric to determine what paradigm to apply in modeling different portions of the time-series data. The AAM 112 determines what paradigms are most suitable for different error values based on accuracy-related considerations (to reduce the impact of Gibbs phenomenon) and complexity-related considerations (to reduce the impact of complex nonlinear computations on processing speed). These principles can be extended to other cases in which the AAM 112 uses other salient characteristics of the time-series data (besides an error value metric) to determine what curve-fitting paradigms to apply to different portions of the time-series data. The principles can likewise be extended to the use of other types of curve-fitting paradigms that achieve their distinguishing advantage through some other factor besides the way they define error value in a cost function.

As used herein, the term "portions" is intended to have broad connotation. For instance, in one case, the AAM 112 can apply the L1 or L2 measure when modeling all of the data points in an entire segment of the time-series data. In another case, the AAM 112 can apply the L1 or L2 measure with respect to each individual data point within the time-series data. In the latter case, the AAM 112 can apply two or more different paradigms for a single collected data segment, if warranted by the characteristics of the data.

B.3. Mixed Use of L1 and L2 Measures

Advancing to FIG. 6, this procedure provides further information regarding the above-identified second technique for fitting a global model to the time-series data, where the global model is composed of multiple local models in aggregate. Recall that in the second technique, the AAM 112 uses a combination of the L1 measure and the L2 measure to generate the global model. The second technique is a non-iterative solution (compared to the third technique, described in the next subsection).

In operation 602, the AAM 112 identifies each portion the time-series data as likely representing normal data or anomalous data. The AAM 112 can apply one or more rules in making this decision. In one case, the AAM 112 can determine how far a portion diverges from a general trend established by the time-series data (as represented by the error value); if the portion diverges from the trend by more than a predetermined threshold, it can be labeled as anomalous.

In operation 604, the AAM 112 can apply an L2 measure when generating the global model for normal portions of the time-series data. The AAM 112 can apply the L1 measure when generating the global model for anomalous portions of the time-series data.

B.4. Exemplary EM Procedure

Advancing to FIG. 7, this procedure provides further information regarding the above-described third technique for fitting a global model to the time-series data, where, again, the global model is formed by combined multiple contiguous local models. Recall that in the third technique, the AAM 112 uses an expectation-maximization approach to apply a mixture of the L1 and L2 measures.

In operation 702, the AAM 112 starts the iterative procedure by computing initial local model values under the assumption that all points in the time-series data are normal. (To facilitate discussion, the local models are loosely referred to below as "splines.") In this initial operation 702, the AAM 112 can apply the L2 measure to all collected data segments.

In operation 704, the AAM 112 performs the first expectation phase computations. In this operation 704, the AAM 112 labels each point of the time-series data as anomalous or normal based on its associated error value (e.g., the distance from the current estimated spline). Further information regarding this operation 704 is provided below.

In operation 708, the AAM 112 updates the spline parameters using the labels generated in operation 704. That is, the L1 measure is applied for portions labeled as anomalous, while the L2 measure is applied for portions labeled as normal. Further information regarding this operation 708 is provided below.

The loop shown in FIG. 7 indicates that the operations 704 and 708 are repeated a plurality of times. Operation 706 determines when the iteration should terminate. In one case, the procedure terminates after a predetermined number of iterations (e.g., without limitation, 10 iterations). In another case, the operation terminates when it is observed that the labeling results produced in operation 704 have stabilized (meaning that these results do not substantially change with successive iterations).

Further information is now provided regarding operation 704, in which the AAM 112 labels time-series points as anomalous or normal. According to one exemplary implementation, the AAM computes the variance of each time segment with respect to the estimated spline using the assumption that the errors follow a normal distribution. The probability of being anomalous is then computed for each point using both a Gaussian distribution and a Laplacian distribution. If the prior estimate of the probability that a point is anomalous is p, then the area of the Laplacian distribution is set to be p and the area of the Gaussian distribution is set to be (1-p). For example, if m anomalous points are expected in n samples, then p would be m/n. If the probability of a point is greater under the Laplacian distribution than under the Gaussian distribution, the point is labeled as anomalous; otherwise it is labeled as normal.

Further information is now provided regarding operation 708, in which the AAM 112 updates the spline parameters. The AAM 112 updates the parameters of the spline by minimizing a cost function computed by summing the error squared for all points labeled as normal and the absolute value of the error for all points labeled as anomalous.

The error for anomalous points is far from zero, since points close to zero are labeled as normal. Based on this observation, the AAM 112 can approximate the absolute value cost function with two linear equations: e.g., a line with slope equal to +1 for positive error values and a line with slope equal to −1 for negative error values. This allows the AAM 112 to efficiently compute the spline parameters by solving a single system of linear equations in an efficient manner.

Note that the EM procedure works so long as the spline does not move so far in any single EM step that it advances to the other side of a point labeled as anomalous. If need be, this can be enforced by repeatedly halving the amount by which the parameters of the spline are changed, until this condition is satisfied. As an aside, note that the continuity and smoothness constraints on the boundaries of the local models are also linear constraints, and can be included in the same series of linear equations as the L1 and L2 cost functions.

FIGS. 13-15 show, without limitation, an exemplary computer program for implementing aspects of the EM procedure shown in FIG. 7. For instance, the series of instructions 1502 in FIG. 15 implement the labeling of data points as anomalous or normal in operation 704.

B.5. Exemplary Output

Figure 12:
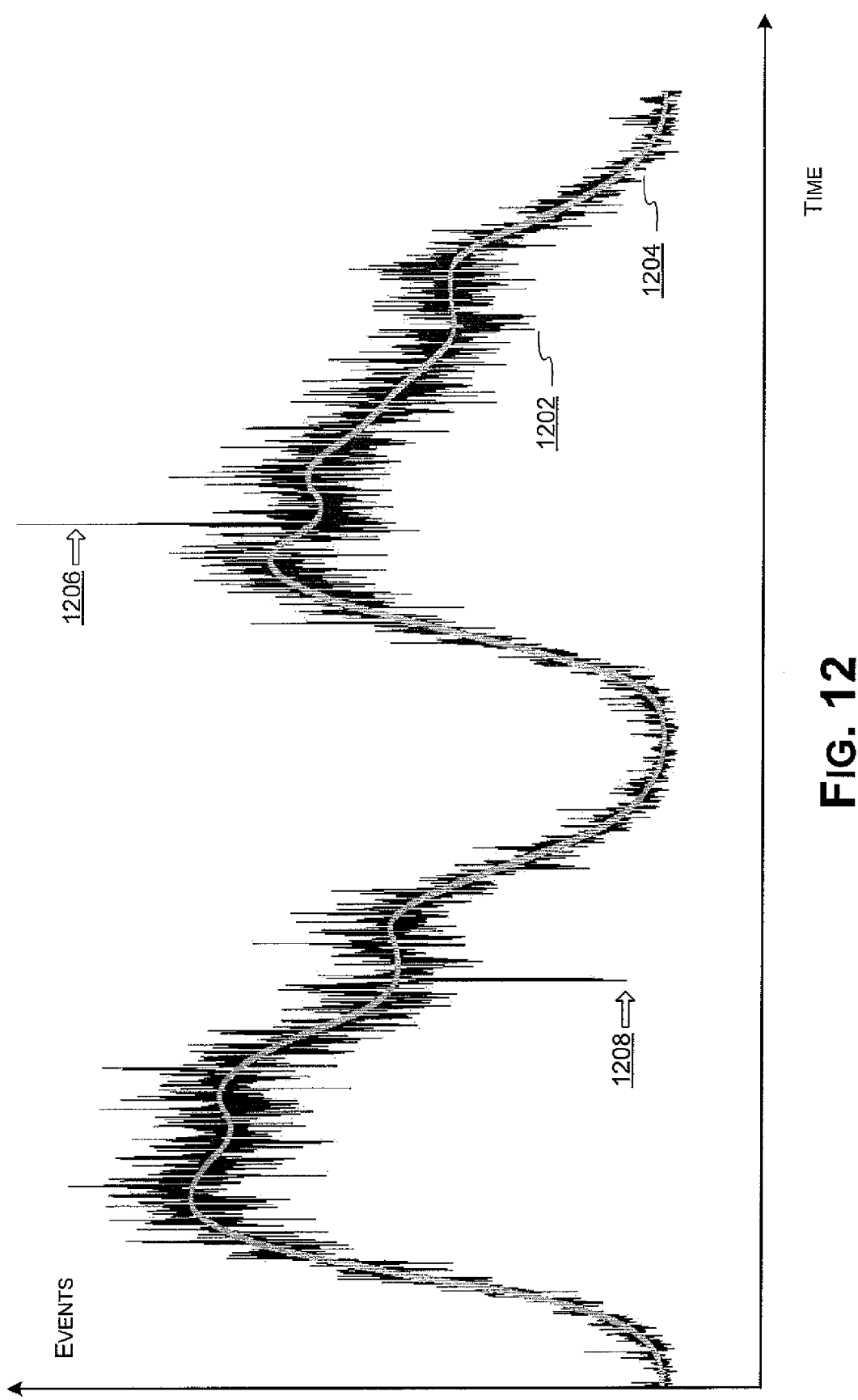
FIG. 12 shows an output of the system of FIG. 1, in which anomalies have been identified in the time-series data.

Finally, FIG. 12 shows an exemplary type of output that can be produced by various implementations of the AAM 112. The output shows the original time-series data 1202, together with a global model 1204 that the AAM 112 has fit to the time-series data 1202. The AAM 112 has marked two potentially anomalous events (1206, 1208) in the time-series data 1202. These events (1206, 1208) are associated with large and rapid changes in the time-series data 1202.

In closing, a number of features were described herein by first identifying exemplary problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A computerized method for detecting one or more anomalies in time-series data, comprising:
    collecting time-series data from an environment to provide collected time-series data, the collected time-series data having a plurality of portions;
    dividing the collected time-series data into a plurality of collected data segments;
    fitting a plurality of local models to the respective plurality of collected data segments, the plurality local models collectively forming a global model; and determining whether there is at least one anomaly in the collected time-series data or no anomalies based on a comparison between the collected time-series data and the global model, wherein the fitting selects a type of model-fitting paradigm to be applied to the collected time-series data to generate the plurality of local models on a portion-by-portion basis, wherein the fitting selects the type of model-fitting paradigm based on an error value metric, the error value metric corresponding to a difference between a point in the collected time-series data and a corresponding model point, wherein the fitting selects a first model-fitting paradigm that relies on an absolute value (L1) measure of the error value metric when a portion of the collected time-series data under consideration is considered anomalous, wherein the fitting selects another model-fitting paradigm that relies on a squared-term (L2) measure of the error value metric when the portion under consideration is considered normal.

2. The computerized method of claim 1, wherein the plurality of portions correspond to a plurality of respective data points.

3. The computerized method of claim 1, wherein the fitting uses an iterative procedure to define whether the portion under consideration is considered anomalous or normal, wherein the iterative procedure provides an opportunity to redefine the portion under consideration from one iteration to a next iteration.

4. The computerized method of claim 3, wherein the iterative procedure is an expectation-maximization procedure,
wherein an expectation stage of the expectation-maximization procedure involves labeling the portion under consideration as anomalous or normal, and
wherein a maximization stage of the expectation-maximization procedure involves generating parameters used to provide a local model for the portion under consideration, the maximization stage relying on the labeling performed by the expectation stage.

5. The computerized method of claim 1, wherein an abnormal portion is assumed to fall around a local model with a first probability distribution and a normal portion is assumed to fall around a local model with a second probability distribution, wherein the portion under consideration is labeled as abnormal or normal depending on the probability distribution deemed most likely to apply to the portion under consideration.

6. The computerized method of claim 5, wherein the first probability distribution is a Laplacian distribution and the second probability distribution is a Gaussian distribution.

7. The computerized method of claim 1, wherein an abnormal portion is assumed to fall around a local model with a first probability distribution and a normal portion is assumed to fall around a local model with a second probability distribution, wherein the portion under consideration is labeled as abnormal or normal depending on the probability distribution deemed most likely to apply to the portion under consideration.

8. The computerized method of claim 1, wherein the collected time-series data reflects transactions that occur within the environment.

9. The computerized method of claim 1, wherein the collected time-series data reflects traffic within a network environment, and wherein said at least one anomaly is associated with either a dramatic increase or decrease in the traffic.

10. The computerized method of claim 1, wherein the collected time-series data comprises a plurality of instances of collected time-series data that have been collected from a plurality of respective collection points in the environment, and wherein the dividing, fitting, and determining are performed on the plurality of instances of collected time-series data in a single batch operation.

11. One or more machine-readable storage media containing machine-readable instructions for implementing the computerized method of claim 1.

12. One or more computing devices, comprising:
one or more processors; and
memory to store computer-executable instructions that, when executed by the one or more processors, perform the computerized method of claim 1.

13. A computerized method for detecting one or more anomalies in time-series data, comprising:
collecting time-series data from an environment to provide collected time-series data, the collected time-series data having a plurality of portions;
dividing the collected time-series data into a plurality of collected data segments;
labeling portions of the collected time-series data as either anomalous or normal;
fitting a plurality of local models to the respective plurality of collected data segments, the plurality of local models collectively forming a global model, wherein the fitting uses a first model-fitting paradigm for any portion of the time-series data that is considered anomalous and a second model-fitting paradigm for any portion of the time-series data that is considered normal, wherein the first model-fitting paradigm involves using an absolute value (L1) measure to represent an error value metric, and wherein the second model-fitting paradigm involves using a squared-term (L2) measure to represent the error value metric, the error value metric corresponding to a difference between a point in the collected time-series data and a corresponding model point; and
determining whether there is at least one anomaly in the collected time-series data or no anomalies based on a comparison between the collected time-series data and the global model.

14. The computerized method of claim 13, further comprising repeating the labeling and fitting a plurality of time-series data using an expectation-maximization procedure.

15. One or more machine-readable storage media containing machine-readable instructions for implementing the computerized method of claim 13.

16. One or more computing devices, comprising:
one or more processors; and
memory to store computer-executable instructions that, when executed by the one or more processors, perform the computerized method of claim 13.

17. An analysis system for detecting one or more anomalies in time-series data, comprising:
a data receiving module configured to collect time-series data from an environment to provided collected time-series data;
an anomaly analysis module configured to:
divide the collected time-series data into a plurality of collected data segments, the collected time-series data having a plurality of portions;
fit a plurality of local models to the respective plurality of collected data segments using a plurality of different model-fitting paradigms, the plurality of local models collectively forming a global model; and
identify at least one anomaly in the collected time-series data based on a comparison between the collected time-series data and the global model, to thereby provide an output result, wherein the fitting selects the plurality of different model-fitting paradigms to achieve a desired combination of accuracy and computational processing speed, wherein the fitting uses a first model-fitting paradigm for any portion of the time-series data that is considered anomalous and a second model-fitting paradigm for any portion of the time-series data that is considered normal, wherein the first model-fitting paradigm involves using an absolute value (L1) measure to represent an error value metric, and wherein the second model-fitting paradigm involves using a squared-term (L2) measure to represent the error value metric, the error value metric corresponding to a difference between a point in the collected time-series data and a corresponding model point; and an output module configured to provide the output result.

\* \* \* \* \*